(12) United States Patent
Kimura

(10) Patent No.: US 6,633,089 B2
(45) Date of Patent: Oct. 14, 2003

(54) ENGINE ROOM HARNESS ROUTING STRUCTURE

(75) Inventor: Fumikazu Kimura, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/051,045

(22) Filed: Jan. 22, 2002

(65) Prior Publication Data

US 2002/0130553 A1 Sep. 19, 2002

(30) Foreign Application Priority Data

Mar. 13, 2001 (JP) .................................. 2001-070971

(51) Int. Cl.[7] ................................................ B60L 1/00
(52) U.S. Cl. ..................... 307/10.1; 296/192; 174/72 A
(58) Field of Search ....................... 296/192; 174/72 A; 307/10.1; 180/90; 361/690

(56) References Cited

U.S. PATENT DOCUMENTS

| | | | | |
|---|---|---|---|---|
| 4,909,566 A | * | 3/1990 | Hashimoto et al. ......... 296/192 |
| 5,201,625 A | * | 4/1993 | Takenouchi et al. ........ 411/369 |
| 5,474,716 A | * | 12/1995 | Lisowsky ..................... 297/70 |
| 5,856,908 A | * | 1/1999 | Takiguchi et al. ......... 174/72 A |
| 5,912,511 A | * | 6/1999 | Hidaka ....................... 307/10.1 |

OTHER PUBLICATIONS

Toyota Opa Repair Manural, p. PI–136, Issued in May 2000.

* cited by examiner

Primary Examiner—Stephen W. Jackson
Assistant Examiner—Robert L. DeBeradinis
(74) Attorney, Agent, or Firm—Shinjyu Global IP Counselors, LLP.

(57) ABSTRACT

An engine room harness routing structure is provided that allows a harness trunk line to be routed without imposing restrictions on the design of the vehicle body. The harness trunk line is housed in an upper position inside a cowl box having a relatively large amount of leeway in its cross sectional area and is routed in the widthwise direction of the vehicle inside the cowl box. Consequently, there is no need to secure space for mounting the harness between the under surface of the cowl box and the upper surface a brake master cylinder back installed there below. As a result, the problem of the height of the cowl box from the ground increasing and affecting the design of the vehicle body can be avoided and the layout of harness trunk line can be established so as not to restrict the vehicle model.

20 Claims, 3 Drawing Sheets

ENGINE ROOM HARNESS ROUTING STRUCTURE

BACKGROUND OF THE INVENTION

1. Field of the Invention

The present invention relates to a routing structure for an engine room harness that is arranged inside an engine room and supplies battery voltage to various electrical components installed inside the engine room.

2. Background Information

An engine room harness of a vehicle comprises a plurality of harness wires bundled into a harness trunk line. The harness trunk line has one end connected to a battery of the vehicle, and the other end connected to various electrical components installed inside the engine room of the vehicle. The battery of a vehicle is installed on one side inside the engine room. Thus, the harness truck line is typically routed from one lateral side of the engine room where the battery is installed to the other lateral side of the engine room. Typically, the harness truck line extends in the vehicle widthwise direction along the upper part of the lower dash panel. (See page PI-136 of the repair manual for the Toyota Opa, issued in May 2000.)

There exists a need for an improved engine room harness routing structure that allows a harness trunk line to be routed without imposing restrictions on the design of the vehicle body. This invention addresses this need in the art as well as other needs, which will become apparent to those skilled in the art from this disclosure.

SUMMARY OF THE INVENTION

It has been discovered that the back part of the brake master cylinder, the air conditioner piping, and other engine room components are typically mounted to the lower dash panel. Consequently, when the harness trunk line is routed in the vehicle widthwise direction along the upper part of the lower dash panel, the harness trunk line is fastened with a plurality of harness clips or the like to the lower dash panel between the engine room components and the cowl box thereabove. However, since the harness trunk line has a relatively large outer diameter (30 to 40 mm), it is necessary to provide a relatively large harness mounting space between the engine room components and the cowl box.

Therefore, when one attempts to provide the necessary closed cross sectional height for the cowl box in view of vehicle rigidity and installing the wiper unit, the height of the cowl box relative to the ground increases and the position of the bottom edge of the front windshield becomes higher. The degree of design freedom for the vehicle body is effected, and ultimately the layout cannot be completed unless there is a lot of leeway in the total vehicle height, such as in the case of a minivan.

Meanwhile, it is also feasible to route the harness trunk line through the inside of the cross section of the upper rail of the radiator core at the front of the engine room instead of routing it along the lower dash panel at the rear of the engine room. However, this arrangement would cause the cross sectional height of the upper rail of the radiator core to increase, which in turn would cause the tip of the engine hood to be higher with respect to the ground. Thus, routing the harness trunk line through the upper rail of the radiator core would greatly affect the design of the front end of the vehicle. Such an arrangement would also result in a cost disadvantage in cases where the front end of the vehicle is modularized because the harness would have to be divided.

In view of these issues, one object of the present invention is to provide an engine room harness routing structure that allows the harness trunk line to be routed without causing restrictions on the vehicle body design.

The foregoing object can basically be attained by providing an engine room harness routing structure for a vehicle. The engine room harness routing structure comprises a cowl box and a harness trunk line. The cowl box is configured to extend in a widthwise direction of the vehicle. The harness trunk line is partially housed within an upper region of the cowl box to extend in the widthwise direction of the vehicle inside the cowl box. The harness trunk line is configured to be electrically coupled to a battery to supply battery voltage to at least one electrical component installed inside an engine room of the vehicle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
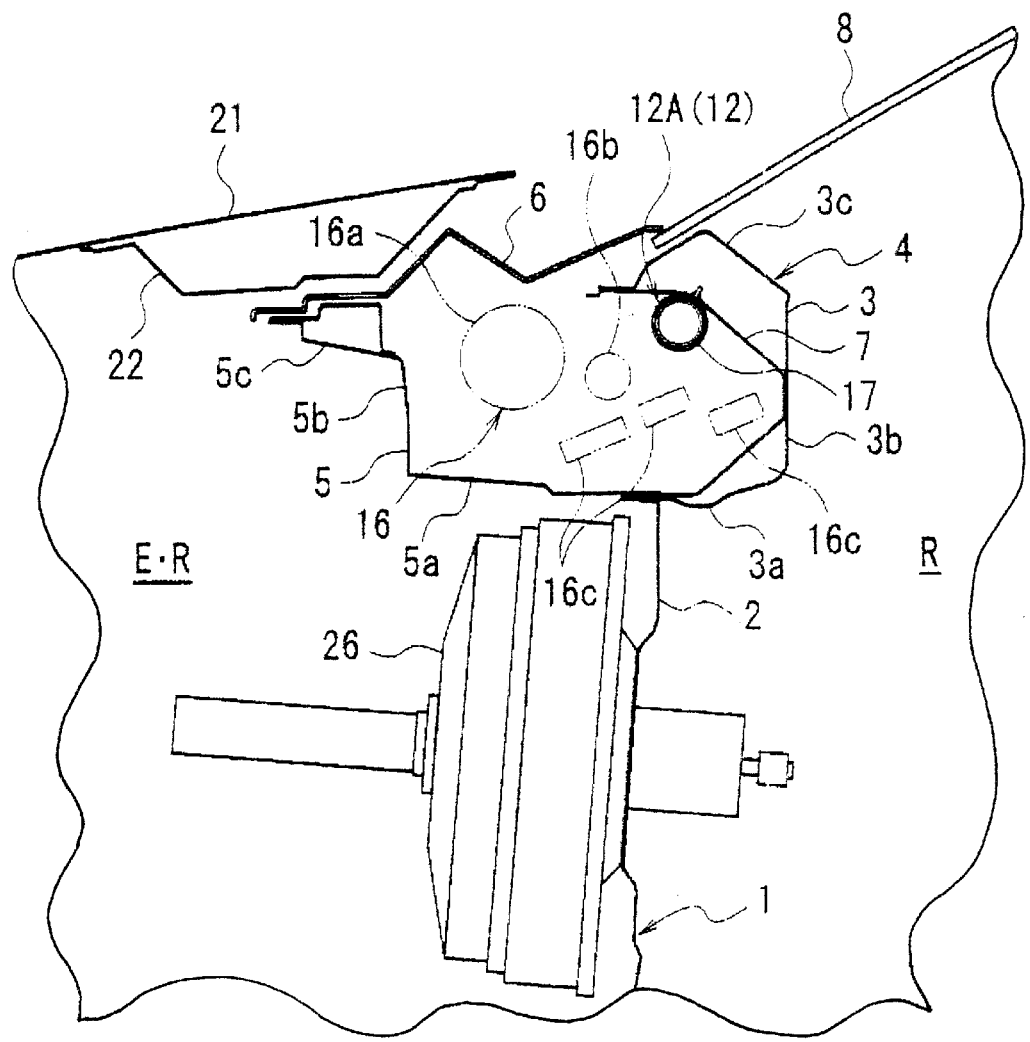
FIG. 1 is a partial schematic cross sectional view of a front portion of a vehicle with an engine room harness routing structure installed therein in accordance with one embodiment of the present invention.
Figure 2:
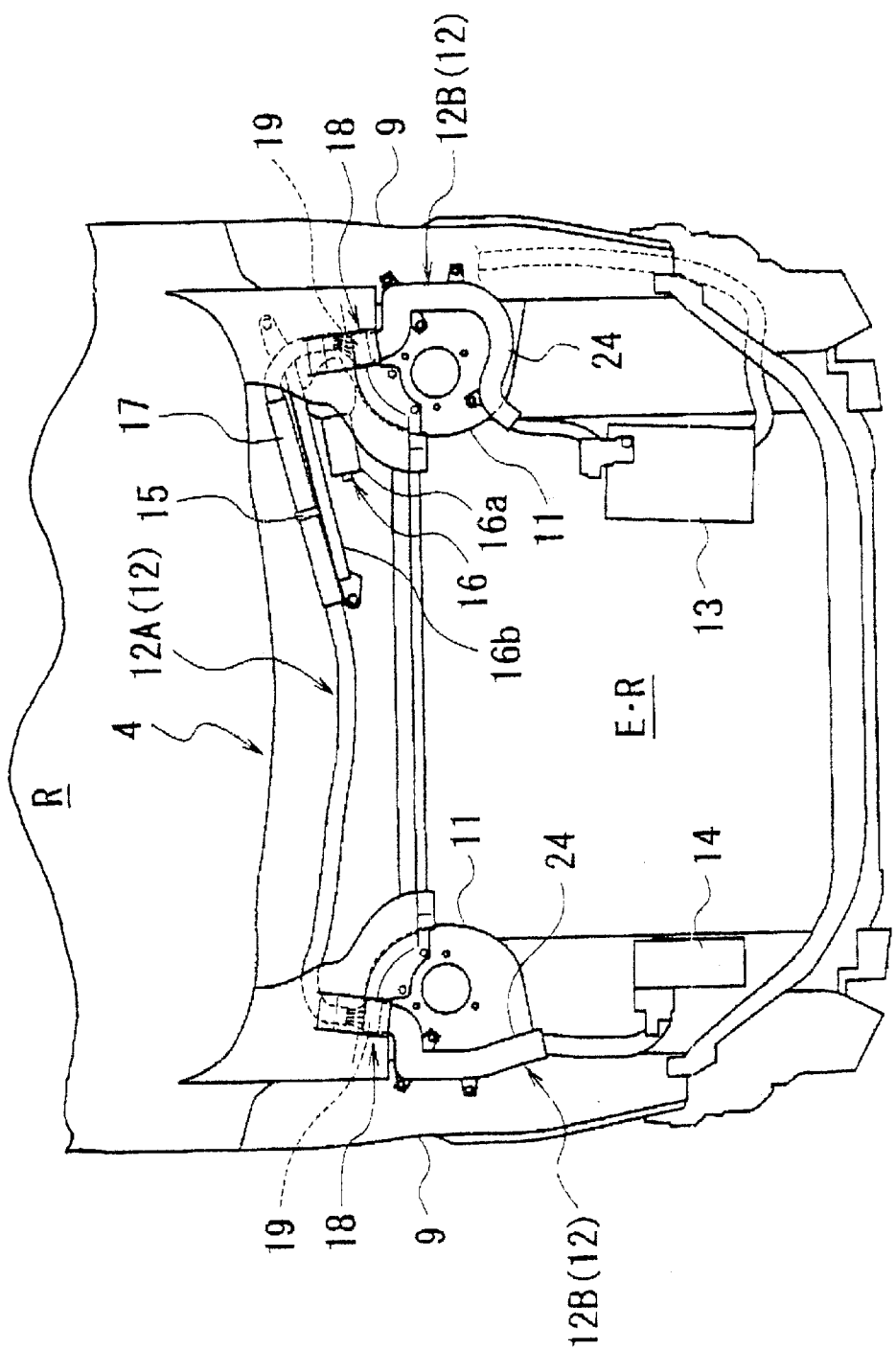
FIG. 2 is a top plan view of the front portion of the vehicle illustrated in FIG. 1 with the engine room harness routing structure installed therein in accordance with one embodiment of the present invention.
Figure 3:
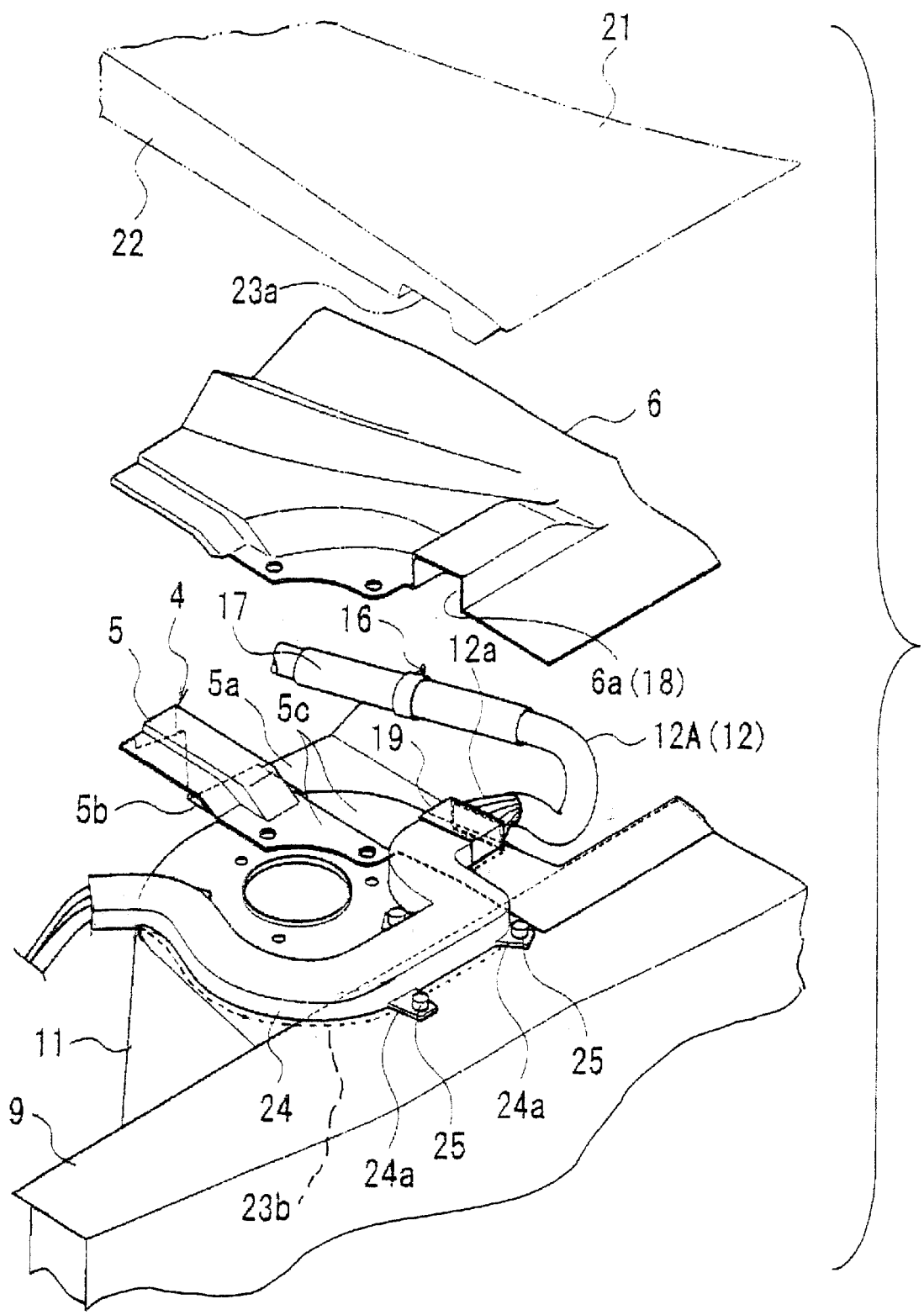
FIG. 3 is a partial exploded perspective view of the front portion of the vehicle illustrated in FIGS. 1 and 2 showing the engine room harness routing structure in the vicinity of the harness passage part.

Referring to FIGS. 1 to 3, a partial cross sectional view of a front portion of a vehicle is illustrated with an engine room harness routing structure installed therein in accordance with one embodiment of the present invention. A dash panel 1 separates an engine room ER of the vehicle from a cabin R. The dash panel 1 basically includes a lower dash panel 2 and an upper dash panel 3 that is jointed to the upper edge of the lower dash panel 2.

A cowl box 4 disposed in the widthwise direction of the vehicle on the front waist portion of the vehicle body. The cowl box 4 is basically formed by the upper dash panel 3, a front cowl panel 5 and a cowl cover 6. The upper dash panel 3, the front cowl panel 5 and the cowl cover 6 are all arranged so as to give the cowl box 4 a closed cross sectional shape. The upper dash panel 3 forms the rear wall of the cowl box 4. The front cowl panel 5 forms the front wall of the cowl box 4. The cowl cover 6 forms the upper wall of the cowl box 4. The cowl box 4 functions as a laterally oriented frame support member of the front waist portion of the vehicle. The cowl box 4 also functions as an external air inlet that directs external air to an air conditioning unit (not shown). The cowl box 4 further acts as a housing for a wiper unit 16.

The upper dash panel 3 has a bottom wall 3a, a rear wall 3b, and an upper wall 3c. A reinforcing member 7 is joined to the interiors of the bottom wall 3a, the rear wall 3b, and the upper wall 3c of the upper dash panel 3. Thus, the reinforcing member 7 spans these walls 3a, 3b and 3c to reinforce the upper dash panel 3.

The front cowl panel 5 is provided a bottom wall 5a, a front wall 5b that stands up from a bottom wall 5a and a projecting rim 5c that is bent so as to project toward the front of the vehicle from the upper edge of the front wall 5b.

The rear edge of the bottom wall 5a of the front cowl panel 5 overlaps and is joined together with the lower edge of the reinforcing member 7, the front edge of the bottom wall of the upper dash panel 3, and the upper edge of the lower dash panel 2.

The front end part of the cowl cover 6 overlaps the projecting rim 5c, which is the front edge part of the front cowl panel 5, with a pair of seal element 19 therebetween. The front end part of the cowl cover 6 is fastened to the projecting rim 5c of the front cowl panel 5 by clips or the like (not shown). The rear end part of the cowl cover 6 covers the lower edge part of the front windshield 8, which is adhesively fixed to the upper wall 3c of the upper dash panel 3.

The laterally facing ends of the cowl box 4 are coupled to a pair of hood ridge panels 9, which form parts of the lateral side walls of the engine room ER. In this embodiment, the laterally facing end parts of the projecting rim 5c of the front cowl panel 5 are joined to upper surfaces of a pair of strut housings 11, which are joined to the inside of the hood ridge panels 9. Thus, the cowl box 4 functions as a strut bar or support member for preventing inward movement of the strut housings 11. The right hood ridge panel 9 and the right strut housing 11 are mirror images of the left hood ridge panel 9 and the left strut housing 11, respectively.

A harness trunk line 12, which is arranged inside the engine room ER and supplies voltage from a battery 13 (installed on one side of the inside of the engine room ER) to various electrical components installed inside the engine room ER (e.g., a relay box or electrical component 14 installed on the other side inside the engine room ER, as shown in FIG. 2). The harness trunk line 12 has a middle harness trunk line portion 12A and a pair of end harness trunk line portions 12B.

The harness trunk line 12 comprises a plurality of harness wires 12a that are bundled into a circular shape. The middle harness trunk line portion 12A is housed inside an upper region of the cowl box 4, which is routed in the vehicle-widthwise direction of the cowl box 4.

The middle harness trunk line portion 12A, which is housed inside the cowl box 4, is fastened to a rear wall of the cowl box 4, e.g., to the reinforcing member 7, at a plurality of locations using a plurality of harness clips 15.

A wiper unit 16 comprising a wiper motor 16a, a support frame 16b, and a wiper link 16c is installed and secured inside the cowl box 4. The middle harness trunk line portion 12A has a section that faces the wiper unit 16. This section of the middle harness trunk line portion 12A is covered with a hard tube 17 made of hard resin or the like.

Although in this embodiment the middle harness trunk line portion 12A is covered only partially by the hard tube 17, it is also acceptable for the hard tube 17 to cover the entire portion of the middle harness trunk line portion 12A that is housed inside the cowl box 4.

Each side of the forward portion of the cowl box 4 is provided with a harness passageways 18. Both ends of the middle harness trunk line portion 12A, which is housed inside the cowl box 4, pass through the sealing elements 19 that are located in the harness passageways 18. Each terminal of the harness wires 12a is connected to the battery 13 and the electrical component 14 or some other electrical component.

In this embodiment, each of recessed parts 6a is formed in a localized portion of the cowl cover 6 and each of the harness passageways 18 is formed by the recessed part 6a and the projecting rim 5c of the front cowl panel 5.

The end harness trunk line portions 12B, which are drawn out into the engine room ER from the inside of the cowl box 4, is secured partially to the upper surfaces of the strut housings 11 and the upper surfaces of the hood ridge panels 9. The engine hood 21 has a hood inner surface 22 that has a pair of recesses 23a. The upper surfaces of the strut housings 11 and the upper surfaces the hood ridge panels form a pair of recesses 23b. Recesses 23a and 23b that correspond to the portions of the end harness trunk line portions 12B roughly match the external shape and cross sectional shape of the end harness trunk line portions 12B. The end harness trunk line portions 12B are held inside the recesses 23a and 23b.

In this embodiment, the entire portions of the end harness trunk line portions 12B that are arranged on the upper surfaces of the strut housings 11 (starting from the portion passing through the harness passageways 18) has a flat rectangular cross sectional shape. The term "flat cross sectional shape" as used herein refers to a cross section that has a larger width than height. Therefore, the recessed parts 6a of the cowl cover 6 (which form harness passageways 18) and the recesses 23a of the hood inner surface 22 are formed with rectangular cross sections that match the flat cross sectional shape of the end harness trunk line portions 12B.

The flat cross sectional shape of the end harness trunk line portions 12B can be accomplished in this embodiment by separating the plurality of harness wires 12a that are bundled into a circular shape in the middle harness trunk line portion 12A and housing them in a harness protector 24 that has a rectangular tube form with a flat cross sectional shape. Preferably, the harness protector 24 is constructed of a resin material or the like.

In this embodiment, the lower portion of the harness protector 24 has a plurality of brackets 24a formed thereon. The brackets 24a are fastened to the upper surfaces of the strut housings 11 and the upper surfaces of the hood ridge panels 9 by a plurality of screws 25.

As seen in FIG. 1, a back portion of the brake master cylinder 26 is mounted to the lower dash panel 2.

With the structure of the embodiment described above, the cowl box 4 that houses the middle harness trunk line portion 12A has a relatively large amount of leeway in its closed cross sectional area and the middle harness trunk line portion 12A runs in the widthwise direction of the vehicle inside the cowl box 4. Consequently, it is not necessary to secure mounting space for the middle harness trunk line portion 12A between the under surface of the cowl box 4 and the upper surface of the brake master cylinder 26 or other engine room component as in conventional routing structures. As a result, the problem of the height of the cowl box 4 from the ground increasing and affecting the design of the vehicle body can be avoided and the layout of the harness trunk line 12 can be established so as not to restrict the vehicle model.

Also, since the middle harness trunk line portion 12A is routed along the upper region of the inside of the cowl box 4, the middle harness trunk line portion 12A can be protected from exposure to water even in cases where the surface of water that has collected in the bottom of the cowl box 4 rises in a localized manner due to acceleration or the like when traveling in rainy weather.

Furthermore, the fact that the middle harness trunk line portion 12A is housed inside the cowl box 4 is also advantageous in terms of shielding the middle harness trunk line portion 12A from heat.

Moreover, in this embodiment, the middle harness trunk line portion 12A is mounted to the reinforcing member 7, which is joined to the upper dash panel 3 that forms the rear wall of the cowl box 4. Therefore, the middle harness trunk line portion 12A can be mounted easily during the assembly process by first mounting the middle harness trunk line portion 12A and the reinforcing member 7, and then installing wiper unit 16 as well as the front cowl panel 5 and the cowl cover 6. Furthermore, this arrangement is advantageous in terms of insulating the middle harness trunk line portion 12A from heat because the middle harness trunk line portion 12A is farther from the engine room ER.

Since the portion of the middle harness trunk line portion 12A that faces the wiper unit 16, which is covered with the hard tube 17, variance in the mounting position of the middle harness trunk line portion 12A and movement of the middle harness trunk line portion 12A due to vehicle vibrations can be prevented. Moreover, this arrangement prevents the middle harness trunk line portion 12A from interfering with the wiper unit 16.

Additionally, since the harness passageways 18, which are used for drawing the harness trunk line 12 into the engine room ER from the cowl box 4, are provided at the front portion of the cowl box 4, the harness passageways 18 can be formed by providing a recessed part either in the front cowl panel 5 of the cowl box 4 or in the cowl cover 6 that is fixed to the front cowl panel 5. Thus harness passageways 18 can be designed easily. More specifically, in this embodiment, the recessed parts 6a that form the harness passageways 18 are provided in the cowl cover 6 such that notches do not have to be machined into the front cowl panel 5. Consequently, when the cowl box 4 is joined to the upper surfaces of the strut housings 11 so as to span the inside of the engine room ER in the widthwise direction of the vehicle and made to function as a strut bar, there is no ill effect on the rigidity of the strut bar and the inward leaning rigidity of the strut housings 11 can be ensured.

Also, the end harness trunk line portions 12B, which are drawn from the inside of the cowl box 4 through the harness passageways 18 into the engine room ER, are held in the recesses 23a and 23b provided in the under surface of the engine hood 21. This arrangement is even more advantageous in terms of the design of the vehicle body because the engine hood 21 can be prevented from becoming higher relative to the ground.

Moreover, since the portions of the end harness trunk line portions 12B that are held in the recesses 23a and 23b has a flat cross section, the recesses 23a and 23b can be shallow and the recesses 23a and 23b can be formed in a manner that is advantageous in terms of strength and in terms of the forming process. It is also acceptable to form the recesses 23b in the upper surfaces of the strut housings 11 and hold the end harness trunk line portions 12B in a partial manner therein.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2001-070971. The entire disclosure of Japanese Patent Application No. 2001-070971 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine room harness routing structure for a vehicle, the engine room harness routing structure comprising:

a cowl box configured to extend in a widthwise direction of the vehicle; and a harness trunk line partially housed within an upper inside region of the cowl box to extend in the widthwise direction of the vehicle inside the cowl box such that the harness trunk line within the upper inside region of the cowl box is spaced upwardly from a bottom of the cowl box, the harness trunk line being configured to be electrically coupled to a battery to supply battery voltage to at least one electrical component installed inside an engine room of the vehicles, the cowl box including at least one lateral end opening arranged to open within the engine room with the harness trunk line extending therethrough.

2. The engine room harness routing structure as recited in claim 1, wherein the harness trunk line housed inside the cowl box is mounted to a rear wall of the cowl box.

3. The engine room harness routing structure as recited in claim 1, wherein a section of the harness trunk line housed inside the cowl box is covered by a hard tube.

4. The engine room harness routing structure as recited in claim 2, wherein a section of the harness trunk line housed inside the cowl box is covered by a hard tube.

5. The engine room harness routing structure as recited in claim 1, wherein the cowl box has a first harness passageway provided at a first lateral end of the cowl box and a second harness passageway provided at a second lateral end of the cowl box, the first and second harness passageway having first and second sealing element contacting the harness trunk line at first and second points in the first and second harness passageways.

6. The engine room harness routing structure as recited in claim 5, wherein the first and second harness passageways are arranged and configured such that first and second end portions of the harness trunk line that extend from the first and second harness passageways are arranged to be held in recesses provided in at least one of upper surfaces of strut housings and an under surface of an engine hood.

7. The engine room harness routing structure as recited in claim 6, wherein
the first and second end portions of the harness trunk line are formed with a flat cross section.

8. The engine room harness routing structure as recited in claim 5, wherein
the first and second lateral ends of the cowl box are configured to be coupled to upper surfaces of strut housings such that the cowl box spans between lateral side walls of the engine room, and
the first and second harness passageways are constructed by a pair of recesses formed in an upper wall fixed to a front wall portion of the cowl box.

9. The engine room harness routing structure as recited in claim 8, wherein
the first and second harness passageways are arranged and configured such that first and second end portions of the harness trunk line that extend from the first and second harness passageways are arranged to be held in recesses provided in at least one of the upper surface of the strut housings and an under surface of an engine hood.

10. The engine room harness routing structure as recited in claim 9, wherein
the first and second end portions of the harness trunk line are formed with a flat cross section.

11. An engine room harness routing structure for a vehicle, the engine room harness routing structure comprising:
cowl box means for forming an elongated housing configured to extend in a widthwise direction of the vehicle; and
harness trunk line means for electrically coupling a battery to at least one electrical component installed inside an engine room of the vehicle for supplying battery voltage to the at least one electrical component installed inside the engine room of the vehicle, the harness trunk lint means being partially housed within an upper inside region of the cowl box means to extend in the widthwise direction of the vehicle inside the cowl box means such that the harness trunk line means within the upper inside region of the cowl box means is spaced upwardly from a bottom of the cowl box means,
the cowl box means including at least one lateral end opening arranged to open within the engine room with the harness trunk line means extending therethrough.

12. A method of muting a harness trunk line in an engine room of a vehicle comprising:
forming a cowl box in a rearward portion of the engine room that is configured to extend in a widthwise direction of the vehicle;
partially installing a harness trunk line within an upper inside region of the cowl box to extend in the widthwise direction of the vehicle inside the cowl box such that the harness trunk line within the upper inside region of the cowl box is upwardly from a bottom of the cowl box; and
electrically coupling the harness trunk line between a battery and at least one electrical component installed inside the engine room of the vehicle by extending the harness trunk line through at least one lateral end opening of the cowl box arranged to open within the engine room.

13. An engine room harness routing structure for a vehicle, the engine room harness routing structure comprising:
a cowl box configured to extend in a widthwise direction of the vehicle; and
a harness trunk line having a section partially housed within an inside region of the cowl box to extend in the widthwise direction of the vehicle inside the cowl box, the section of the harness trunk line being located completely in an upper half of the cowl box, the harness trunk line being configured to be electrically coupled to a battery to supply battery voltage to at least one electrical component installed inside an engine room of the vehicle.

14. The engine room harness routing structure as recited in claim 13, wherein
the harness trunk line housed inside the cowl box is mounted to a rear wall of the cowl box.

15. The engine room harness routing structure as recited in claim 13, wherein
a section of the harness trunk line housed inside the cowl box is covered by a bard tube.

16. The engine room harness routing structure as recited in claim 13, wherein
the cowl box has a first harness passageway provided at a first lateral end of the cowl box and a second harness passageway provided at a second lateral end of the cowl box, the first and second harness passageway having first and second sealing element contacting the harness trunk line at first and second points in the first and second harness passageways.

17. The engine room harness routing structure as recited in claim 16, wherein
the first and second harness passageways are arranged and configured such that first and second end portions of the harness trunk line that extend from the first and second harness passageways are arranged to be held in recesses provided in at least one of upper surfaces of strut housings and an under surface of an engine hood.

18. The engine room harness routing structure as recited in claim 17, wherein
the first and second end portions of the harness trunk line are formed with a flat cross section.

19. The engine room harness routing structure as recited in claim 16, wherein
the first and second lateral ends of the cowl box are configured to be coupled to upper surfaces of strut housings such tat the cowl box spans between lateral side walls of the engine room, and
the first and second harness passageways are constructed by a pair of recesses formed in an upper wall fixed to a front wall portion of the cowl box.

20. The engine room harness routing structure as recited in claim 19, wherein
the first and second harness passageways are arranged and configured such that first and second harness trunk line that extend from the first and second harness passageways are arranged to be held in recesses provided in at least one of the upper surface of the strut housing and an under surface of an engine hood.

* * * * *